United States Patent
Carr et al.

(10) Patent No.: US 10,817,262 B2
(45) Date of Patent: Oct. 27, 2020

(54) REDUCED AND PIPELINED HARDWARE ARCHITECTURE FOR MONTGOMERY MODULAR MULTIPLICATION

(71) Applicant: Enveil, Inc., Fulton, MD (US)

(72) Inventors: Ryan Carr, Fulton, MD (US); Michael J. Badamo, Rockville, MD (US)

(73) Assignee: Enveil, Inc., Fulton, MD (US)

( * ) Notice: Subject to any disclaimer, the term of this patent is extended or adjusted under 35 U.S.C. 154(b) by 153 days.

(21) Appl. No.: 16/184,139

(22) Filed: Nov. 8, 2018

(65) Prior Publication Data

US 2020/0150930 A1    May 14, 2020

(51) Int. Cl.
*G06F 7/72*    (2006.01)

(52) U.S. Cl.
CPC .............. *G06F 7/722* (2013.01); *G06F 7/727* (2013.01); *G06F 7/728* (2013.01)

(58) Field of Classification Search
CPC ..... G06F 7/72; G06F 7/722; G06F 7/724–729
See application file for complete search history.

(56) References Cited

U.S. PATENT DOCUMENTS

| | | |
|---|---|---|
| 5,732,390 A | 3/1998 | Katayanagi et al. |
| 6,178,435 B1 | 1/2001 | Schmookler |
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |

(Continued)

FOREIGN PATENT DOCUMENTS

| | | |
|---|---|---|
| EP | 2873186 B1 | 3/2018 |
| JP | 5680007 B2 | 3/2015 |

(Continued)

OTHER PUBLICATIONS

A. K. Panda and K. C. Ray, "FPGA Prototype of Low Latency BBS PRNG," 2015 IEEE International Symposium on Nanoelectronic and Information Systems, pp. 118-123, 2015 (Year: 2015).*

(Continued)

*Primary Examiner* — Matthew D Sandifer
(74) *Attorney, Agent, or Firm* — Carr & Ferrell LLP (57) ABSTRACT

A hardware implementations of Montgomery modular multiplication are described. The number of components as well as the number of cycles may be reduced by using a lookup table and multiplexer for selecting terms to be added during calculations. Also a loop unrolling technique may be used improve performance. A chain of pipeline adder modules and a chain of delay and shift modules may be used to pipeline calculations of multiple sets of operands.

18 Claims, 3 Drawing Sheets

(56) References Cited

U.S. PATENT DOCUMENTS

| | | |
|---|---|---|
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 2002/0032712 A1 | 3/2002 | Miyasaka et al. |
| 2002/0104002 A1 | 8/2002 | Nishizawa et al. |
| 2003/0037087 A1* | 2/2003 | Rarick ............ G06F 7/728 708/491 |
| 2003/0059041 A1 | 3/2003 | MacKenzie et al. |
| 2004/0167952 A1* | 8/2004 | Gueron ............ G06F 7/728 708/492 |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1* | 1/2006 | Higashi ............ G06F 7/728 380/28 |
| 2006/0008081 A1* | 1/2006 | Higashi ............ G06F 7/728 380/28 |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2012/0265794 A1* | 10/2012 | Niel ............ G06F 7/728 708/209 |
| 2012/0265797 A1* | 10/2012 | Niel ............ G06F 7/728 708/700 |
| 2013/0010950 A1 | 1/2013 | Kerschbaum |
| 2013/0051551 A1 | 2/2013 | El Aimani |
| 2013/0054665 A1 | 2/2013 | Felch |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0246813 A1 | 9/2013 | Mori et al. |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1 | 12/2013 | Kim et al. |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1 | 4/2016 | Kupwade-Patil et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1 | 12/2016 | Gilad-Bachrach et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |

(56) References Cited

U.S. PATENT DOCUMENTS

| | | |
|---|---|---|
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0204341 A1 | 6/2020 | Williams et al. |

FOREIGN PATENT DOCUMENTS

| | | |
|---|---|---|
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

S. K. Sahu and M. Pradhan, "Implementation of Modular Multiplication for RSA Algorithm," 2011 International Conference on Communication Systems and Network Technologies, pp. 112-114, 2011 (Year: 2011).*

Petition to Insitute Derivation Proceeding Pursuant to 35 USC 135; Case No. DER2019-00009, U.S. Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Informaton Retrieval," 14 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "Gazelle: A Low Latency Framework for Secure Neural Network Inference", 27th USENIX Security Symposium, Aug. 15-17, 2018. pp. 1650-1668.

Bösch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Viejo et al., "Asymmetric homomorphisms for secure aggregation in heterogeneous scenarios," Information Fusion 13, Elsevier B.V., Mar. 21, 2011, pp. 285-295.

Patil et al, "Big Data Privacy Using Fully Homomorphic Non-Deterministic Encryption," IEEE 7th International Advance Computing Conference, Jan. 5-7, 2017, 15 pages.

"International Search Report" and "Written Opinion of the International Searching Authority," Patent Cooperation Treaty Application No. PCT/US2018/014535, dated Apr. 19, 2018, 9 pages.

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

* cited by examiner

REDUCED AND PIPELINED HARDWARE ARCHITECTURE FOR MONTGOMERY MODULAR MULTIPLICATION

FIELD OF THE PRESENT TECHNOLOGY

The present disclosure relates to the technical field of hardware encryption and decryption systems and methods. More particularly, the present invention is in the technical field of Montgomery Modular Multiplication using hardware architecture and very large scale integrated circuits such as FPGAs.

BACKGROUND

Modular exponentiation is a mathematical operation of the following form:

$$R = B^E \bmod M$$

where the result R, base B, exponent E, and modulus M are all integers. A modular exponentiation is computed using a series of modular multiplications, using the property that $$B^X B^Y = B^{X+Y}$$

to build from the input B up to the desired exponentiation $B^E$.

Modular exponentiation may be used by encryption systems such as homomorphic cryptosystems and an RSA encryption scheme. For example, RSA uses a modular exponentiation to perform both encryption and decryption: for encryption, B is the plaintext, E and M are parts of the public key, and R is the resulting ciphertext; for decryption, B is the ciphertext, E is the private key, M is part of the public key, and R is the resulting plaintext.

The performance of such cryptosystems depends on the implementation efficiency of the modular multiplication and exponentiation. The operands include plain text of a message, the cipher, and/or possibly a partially ciphered text. Operands are generally larger than word sizes in typical computer processor architecture. For example, operands can be 128-1024-bit words or more, whereas a typical processor may use 32- or 64-bit words. The time requirements for encryption/decryption operations using modular exponentiation may be reduced by reducing the number of modular multiplications performed and/or by reducing the time requirements to perform a single modular multiplication. Using hardware implementations for cryptosystems instead of software implementations can reduce the number of operations, for example, by designing hardware that can perform operations on word sizes larger than word sizes used in typical computers. However, increasing the word size in hardware also increases the device count in the integrated circuits, which increases complexity and cost.

SUMMARY

Various embodiments of the present technology include a hardware adder configured for performing Montgomery modular multiplication. The hardware adder further includes a first operand register for receiving a first operand, second operand register for receiving a second operand, and modulus register for receiving a modulus, and a sum register for receiving a sum of the second operand and the modulus; a first shift register configured for receiving the first operand from the first operand register and shifting the first operand; and a second shift register configured to shift a result of a previous cycle. The hardware adder further includes a multiplexer for selecting one of a zero, the modulus, the second operand, or the second operand and modulus sum, responsive to a predetermined bit of the second operand, a bit shifted out of the first shift register, and a predetermined bit of the current result; an adder configured to receive a selection from the multiplexer and a shifted previous result from the second shift register and output a current result; and a result accumulator to receive the result from the adder and output the current result to the second shift register as a previous result.

Various embodiments of the present technology include a system for pipelining Montgomery modular multiplication. The system includes a first operand register for receiving a first operand (A), second operand register for receiving a second operand (B), and modulus register for receiving a modulus (M), and a sum register for receiving a sum of the second operand and the modulus (sum M+B); a first shift register configured for receiving the received operand A and shifting out a plurality of bits of A; and a second shift register configured to receive a result of a plurality of bits and output a shifted result. The system further includes a plurality of pipeline adders chained together such that the first pipeline adder receives the shifted result from the second shift register, and each of a plurality of the subsequent pipeline adders receives a result of a previous pipeline adder, each pipeline adder comprising: a multiplexer for selecting one of a zero, M, B, or sum M+B, responsive to a plurality of bits selected from each of B, the first shift register, and the current result, and an adder configured to add the received result to the selection from the multiplexer and output a result to the next pipeline adder in the chain. The system also includes a plurality of delay modules chained together. The first delay module may be configured to receive values including sum M+B, B, and M, and delay and shift the received values for output to a subsequent pipeline adder and delay module. Each subsequent delay module may be configured to receive the delayed and shifted values from the previous delay module, and further delay and shift the received delayed and shifted values for output the to a subsequent delay module. The system also includes a result accumulator configured to receive the result from the final pipeline adder in the chain, and output the result to the second shift register.

Various embodiments of the present technology include a hardware circuit configured for performing a method of calculating a result of Montgomery modular multiplication, the hardware circuit including a multiplexer, a shift register, an adder, and a plurality of registers, the method comprising receiving operand A at a first register of the hardware circuit, operand B at a second register of the hardware circuit, and a modulus M at a third register of the hardware circuit and setting a result value R in a result register of the hardware circuit to 0. The method further includes initializing a value of a loop counter i in an index register to 0, and initializing an end of loop value to n. The method also includes steps of 1) if $a_0$ equals 0 and $r_0$ equals 0, then: dividing (R+0) by 2, and placing the result of the division in the result register;
2) if $a_0$ equals 0 and $r_0$ equals 1, then: dividing (R+M) by 2, and placing the result of the division in the result register;
3) if $a_0$ equals 1 and $b_0$ equals $r_0$, then: dividing (R+B) by 2, and placing the result of the division in the result register;
4) if $a_0$ equals 1 and $b_0$ is not equal to $r_0$, then: dividing (R+M+B) by 2, and placing the result in the result register;
5) dividing A by 2; placing the result of the division of A by 2 in the first register; adding 1 to i and placing the result of the addition in the index register if i is less than n, returning to step 1.

The method further includes if R is greater than M then: subtracting M from R, and placing the result in the result register.

Various embodiments of the present technology include a device for performing Montgomery modular multiplication, the device comprising a first register for receiving a operand A, second register for receiving operand B, a third register for receiving a modulus M, and a sum register for receiving a sum M+B. The device further includes a first shift register configured for receiving A from the first register and repeatedly shifting $a_0$ of A out of the first shift register; and a second shift register configured to shift a result R and output R div 2. The device also includes a multiplexer for performing a selection of one of 0, M, B, or M+B based on a received select word; and an adder configured to: receive the selection of one of 0, M, B, or M+B from the multiplexer, receive R div 2 from the second shift register, and add R div 2 to the received selection. The device further includes a result accumulator to receive a result R of the addition from the adder and output the result R to the second shift register; and a controller including: logic configured to receive $b_0$, $a_0$, and $r_1$, and output a select word to the multiplexer; and a lookup table, inputs of the lookup table being the received $b_0$, $a_0$, and $r_1$, output of the lookup table being the select word.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more of the same or other features, integers, steps, operations, elements, components, and/or groups thereof.

It will be understood that like or analogous elements and/or components referred to herein may be identified throughout the drawings with like reference characters. It will be further understood that several of the figures are merely schematic representations and/or block diagrams of the present technology. As such, some of the components may have been distorted from their actual scale for pictorial clarity.

In the present disclosure, the terms "lowest significant bit," "LSB," "bit 0" are used interchangeably. The terms "$a_0$," "$b_0$," "$c_0$," . . . and so on refer to bit 0 or the LSB of terms "A," "B," "C," . . . and so on, respectively. Similarly bit 1, bit 2, bit 3 . . . of A may be written as "$a_1$," "$a_2$," "$a_3$," . . . Bits 4-7 of A may be written as "A7:4". The terms "multiplexer" and "MUX" are used interchangeably.

The present technology reduces the number of operations and the device count in hardware cryptosystems. This may be accomplished by reducing the number of steps to perform multiplications and using pipelining.

An RSA cryptosystem includes three items: an integer modulus (M) of around 1024 bits, as well as an integer d and an integer e. Integer d may be referred to as a private key, while the pair (e, M) may be referred to as a public key. These items may satisfy the property $$T^{de} = T \bmod M.$$

The plain text T may obey the condition that 0≤T<M. Messages may be encrypted using the public key as $$C = T^e \bmod M$$

Encrypted messages may be decrypted using the private key as $$T = C^d \bmod M.$$

So the same operation, modular exponentiation, may be used to perform both encryption and decryption.

A modular exponentiation is computed using a series of modular multiplications. Modular multiplication generally consists of two steps: one step generates a product $$P = AB$$

and the other step reduces this product P modulo M.

The Montgomery form (also called Montgomery representation) of some number A mod M is equal to $Ar^i$ mod M, where r is the radix used to represent M and $r^i$>M. For example, if M is a 1024-bit binary number then r=2 and i=1024 is valid.

An efficient algorithm for implementing a series of modular multiplications is to convert the first operands to Montgomery form, perform the multiplications using the Montgomery multiplication algorithm, and then convert the result out of Montgomery form. Montgomery multiplication takes the Montgomery representation of two operands A and B, and produces the Montgomery representation of AB mod M. Montgomery multiplication is faster than a standard modular multiplication because it does not require the division by M that is required to compute the modulus. Instead, it generates a reduced product using a series of additions.

Let operands A be the multiplicand, B the multiplicator, and M the modulus. Also let n be the number of bits, or digits in their binary representation, i.e. the radix is 2. So, we may denote A, B and M as follows:

$$A = \sum_{i=0}^{n} a_i \times 2^i$$

$$B = \sum_{i=0}^{n} b_i \times 2^i$$

$$M = \sum_{i=0}^{n} m_i \times 2^i$$

Conditions for the Montgomery algorithm include a modulus M relatively prime to the radix (no common divisor for M and the radix) and M larger than the multiplicand and the multiplicator. Using a binary representation of the operands requires the modulus M to be odd to satisfy the first condition (relatively prime). The operands A and B must also be in Montgomery form.

The Montgomery algorithm may use the least significant digit of the accumulating modular partial product to determine the multiple of M to subtract. The usual multiplication order is reversed by choosing multiplier digits from least significant to most significant and shifting down. Representing the current modular partial product as R, q is chosen so that R+qM is a multiple of the radix r, which is right-shifted, i.e. divided by r for use in the next iteration. After n iterations, the result obtained is:

$R = ABr^{-n} \bmod M$

Table 1 illustrates a version of a Montgomery algorithm.

TABLE 1

```
algorithm Montgomery(A, B, M) {
    int R = 0;
1:  for i = 0 to n {
2:      R = R + a_iB;
3:      if r_0 = 0 then
4:          R = R div 2
5:      else
6:          R = (R + M) div 2;
    }
    return R;
}
```

Figure 1:
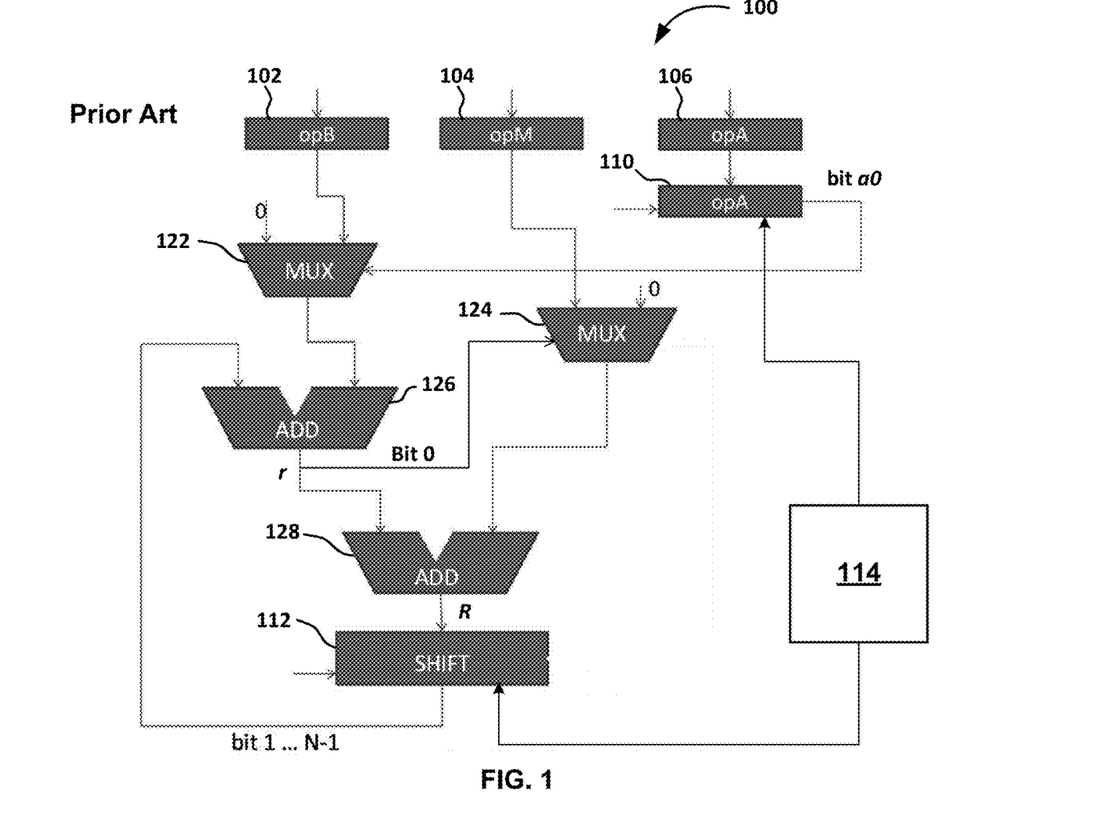
FIG. 1 is a block diagram illustrating a prior art hardware architecture for a Montgomery modular multiplier (MMM) architecture for implementation in hardware.

FIG. 1 is a block diagram illustrating a prior art hardware architecture for a Montgomery modular multiplier (MMM) architecture 100 for implementation in hardware. In various embodiments, the MMM architecture 100 is implemented in Field Programmable Gate Array (FPGA), Application Specific Integrated Circuits, Very Large Scale Integrated Circuits, and/or the like. The MMM architecture 100 of FIG. 1 is configured to receive operands A, B and M and it return $R = (A \times B \times 2^{-n}) \bmod M$ The MMM architecture 100 includes two multiplexers (MUX 122 and MUX 124), two adders (ADD 126 and ADD 128), two shift registers (SHIFT 110 and SHIFT 112), three input registers (opB 102, opM 104, and opA 106) as well as a controller 114, described in more detail in FIG. 2.

The first multiplexer, MUX 122 passes a value of 0 when the LSB, or bit 0 shifted out of the shift register 110, bit $a_0$, is 0, and passes the content of register opB 102 when LSB of $a_0$ shifted out of the first shift register 110 is 1. The second multiplexer, MUX 124 passes a value of 0 or the content of register opM 104 depending on whether the LSB of a result r of adder ADD 126, bit $r_0$, is a 0 or 1, respectively.

The first adder, ADD 126, outputs the sum $R+a_i \times B$ (line 2 of algorithm of Table 1), where i is the iteration number. The second adder, ADD 128 outputs the sum R+M (line 6 of the same algorithm in Table 1). The first shift register, SHIFT 110 provides the bit $a_i$. At each iteration of the multiplier, this shift register is right-shifted once so that $a_0$ contains $a_i$ of the original A operand.

More generally, the operands A and B and Modulus M are fed into the input registers marked opA 106, opB 102, and opM 104, respectively. Multiplexers MUX 122 and MUX 124 control which operands are combined with the intermediate result for each iteration using the adders ADD 126 and 128, and the shift register SHIFT 112 to store the intermediate result. The hardware performs one iteration per bit in operand A. The LSB of the shifted operand opA 110 determines whether operand opB, is added to the result. The LSB of that sum r determines whether operand opM is added to that sum r. The result R is shifted by one bit (marked "bit 1 . . . N−1") in the SHIFT 112 register, that value may be applied to an input of the first adder ADD 126 for the next iteration.

Figure 2:
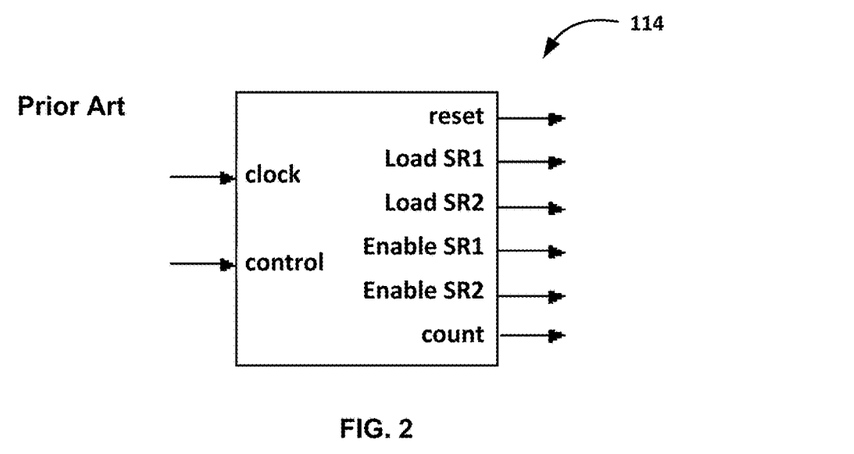
FIG. 2 illustrates details of a prior art controller of FIG. 1.

FIG. 2 illustrates details of a prior art controller 114 of FIG. 1. The controller 114 may be used to synchronize shifting and loading operations of the first shift register SHIFT 110. The controller 114 may also control a number of iterations to be performed by the multiplier, using a simple down counter (not illustrated).

In order to synchronize the work of the components of the architecture 100, the controller 114 includes a state machine, which may have 6 states as illustrated in Table 2.

TABLE 2

| State | Actions |
|---|---|
| S0: | initialization of the state machine; set counter = n go to S1 |
| S1: | load multiplicand and modulus into registers; load multiplicator into shift register1; go to S2; |
| S2: | wait for ADDER1; wait for ADDER2; load multiplicator into shift register2; decrement counter; go to S3; |
| S3: | enable shift register2; enable shift register1; |
| S4: | check the counter; if 0 then go to S5 else go to S2; |
| S5: | halt; |

In the course of developing the claimed technology, it has been determined that the number of cycles can be reduced by eliminating an adder from the MMM architecture 100 illustrated in FIG. 1. Furthermore, device count may also be reduced.

Figure 3:
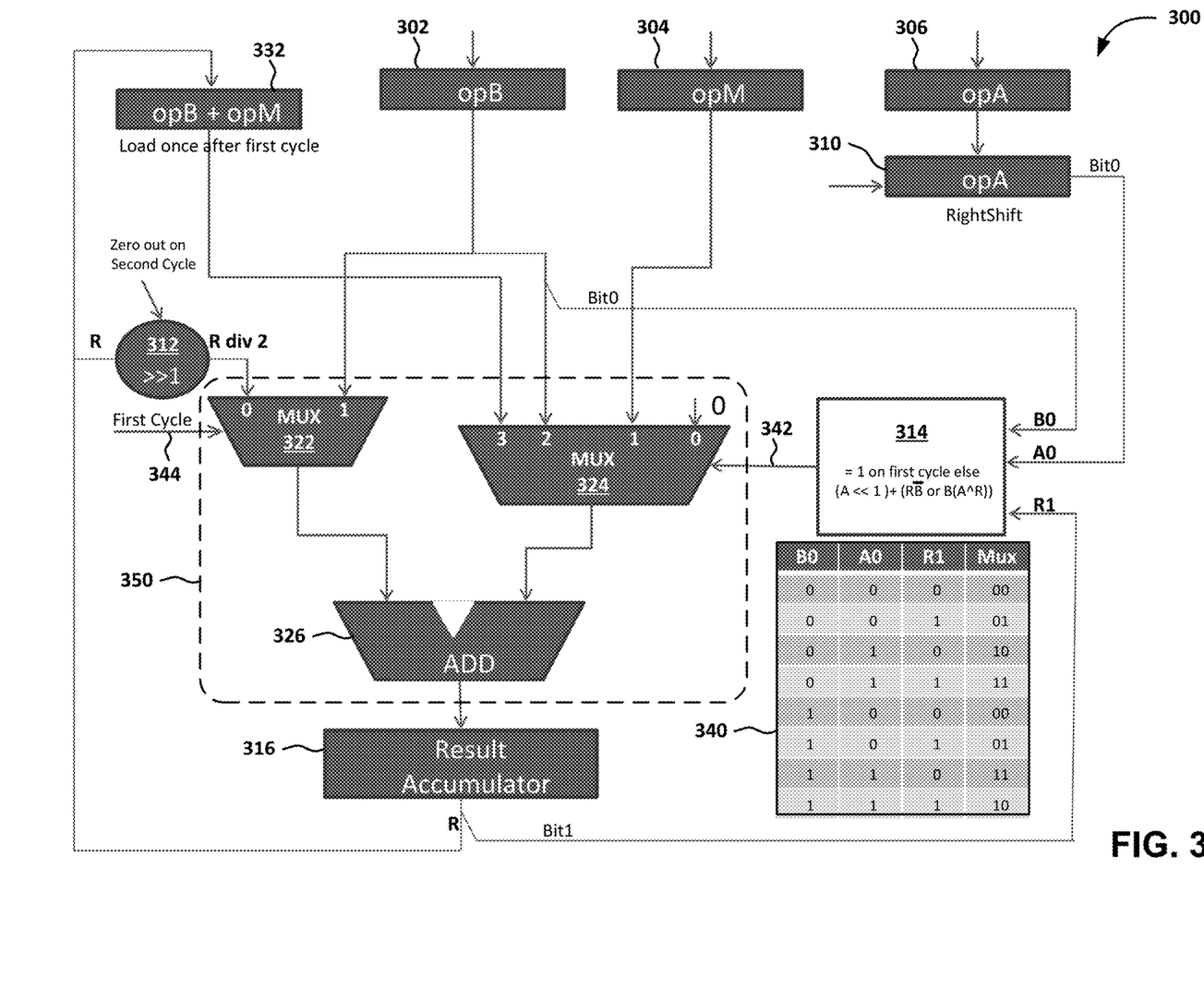
FIG. 3 is a block diagram illustrating a reduced MMM architecture, in accordance with aspects of the claimed technology.

FIG. 3 is a block diagram illustrating a reduced MMM architecture 300, in accordance with aspects of the claimed technology. In various embodiments, the reduced MMM architecture 300 is implemented in FPGAs, Application Specific Integrated Circuits, Very Large Scale Integrated Circuits, and/or the like. The reduced MMM architecture 300 includes a first multiplexer MUX 324, a second multiplexer MUX 322, an adder ADD 326, a first shift register opA 310, a divide by 2 function (R div 2 function) 312, a result accumulator 316), a controller 314, and three input operand registers (opB 302, opM 304, and opA 306). It is noteworthy that the term "accumulator" is a simple register. The label "accumulator" refers to the purpose it serves in conjunction with the adder 326 from iteration to iteration. It is also noteworthy that the output of the accumulator 316 may be guaranteed to enter the adder 326 after the first two iterations.

On the first cycle, a value of 1 is applied to the select input of MUX 322. Also on the first cycle, the controller 314 is configured to apply a value of 1 to the select word 342 input to the MUX 324. In some embodiments, the controller sets the value applied to the select inputs 344 of the MUX 322. Thus, the control input for both the first and second and multiplexers (MUX 322 and MUX 324) is set to 1 on the first cycle. As a result, on the first cycle B is passed from MUX 322 and M is passed from MUX 324 to the adder ADD 326. The adder 326 generates an intermediate result B+M, which may then be loaded to a register 332 upon completion of the first cycle. The register 332 is loaded only once to store the sum B+M for use in later cycles. Since the first cycle is used to load the sum B+M to the register 332, the R div 2 function 312 may be zeroed out on the second cycle so that a 0 is passed to the adder on the second cycle, which begins the MMM calculation. In all other cycles the control bit for the MUX 322 is 0, and a right shifted result from the R div 2 function 312 is applied to the MUX 322, 0 input and passed to the adder 326.

In some embodiments, the controller 314 is used to control when to load the sum B+M to the register 332. The controller 314 may also be used to control when to zero out the R div 2 function 312. The controller 314 may further be used for controlling timing for loading opA into the first shift register 310 and shifting bits of A out of the first shift register 310. The controller 314 may also be used for loading a result from the result accumulator 316, and outputting the shifted result from the R div 2 function 312 to the MUX 322.

On completion of the second and subsequent cycles, the R div 2 function 312 receives the result R from the result accumulator 316 and presents a result R that is shifted 1 bit (or R div 2) to the MUX 322. The MUX 322 then passes R div 2 to the adder 326 for the next cycle.

The adder 326 then adds R div 2 from the MUX 322 to one of 0, M, B, or B+M from the MUX 324, depending on the output of the controller 314. The output of the controller 314 is placed on the select word 342 for input to the MUX 324. The select word 342 includes at least two bits. The output of the controller 314 to the select word 342 is based on the inputs, $b_0$ (bit 0 of B), $a_0$ (bit 0 of shift register 310), and $r_1$ (bit 1 of result accumulator 316). In some embodiments, the controller 314 includes a lookup table 340 that is used for determining the output based on $b_0$, $a_0$, and $r_1$. The controller 314 may also control a number of iterations to be performed by the multiplier, for example, by using a simple down counter (not illustrated).

Table 3 below is an algorithm for describing a process of for determining whether to add 0, M, B, or M+B to the result R, using the circuit illustrated in FIG. 3 and based on the lookup table 340.

TABLE 3

Intermediate Algorithm 1:

Inputs(A, B, M)
int R = 0;
intS = B + M;
for i = 0 to n {
  if $a_0$ == 0 then
    if $r_0$ == 0 then
1)    R' = R
    else
2)    R' = (R + M)
  else
    if $b_0$ == $r_0$ then
3)    R' = (R + B)
    else
4)    R' = (R + S)
A = A div 2
R = R' div 2
}

TABLE 3-continued

Intermediate Algorithm 1:

5) if R > M then
6)  R = R − M
return R

At step 1) of the algorithm in Table 3, $a_0$=0, $r_0$=0. The value 0 is selected by the MUX 324, which results in adding 0 to the result of the previous iteration (labelled R in Table 3 and R div 2 in FIG. 3) according to the lookup table 340. In the pseudo-code of Table 3, $r_0$ refers to the LSB of R after the shift in R div 2 function 312 from the previous iteration has occurred. However, in FIG. 3, R1 is labeled as the result as it leaves the accumulator prior to the shift in R div 2 function 312, so the relevant bit is $r_1$.

At step 2) of the algorithm in Table 3, $a_0$=0, $r_0$=1. M in the register 304 is selected by the MUX 324, which results in adding M to the result of the previous iteration based on the lookup table 340.

At step 3) of the algorithm in Table 3, $a_0$=1, $b_0$=$r_0$. B in the register 302 is selected by the MUX 324, which results in adding B to the result of the previous iteration, based on the lookup table 340.

At step 4) of the algorithm in Table 3, $a_0$=1, $b_0 \neq r_0$. B+M in the register 332 is selected by the MUX 324, which results in adding B+M (S) to the result of the previous iteration, based on the lookup table 340.

Steps 5 and 6 account for a condition that when the for loop completes, R is between M and 2M. Steps 5 and 6 serve to check if this is the case and correct it if so.

The dotted line indicates elements of a pipeline adder 350 that includes the MUX 322, the MUX 324 and the adder 326 of FIG. 3. The pipeline adder 350 may be used as a component of a pipeline architecture to add one of at least four different values to the input R value (i.e., 0, B, M, (M+B)), as described in greater detail elsewhere herein.

Figure 4:
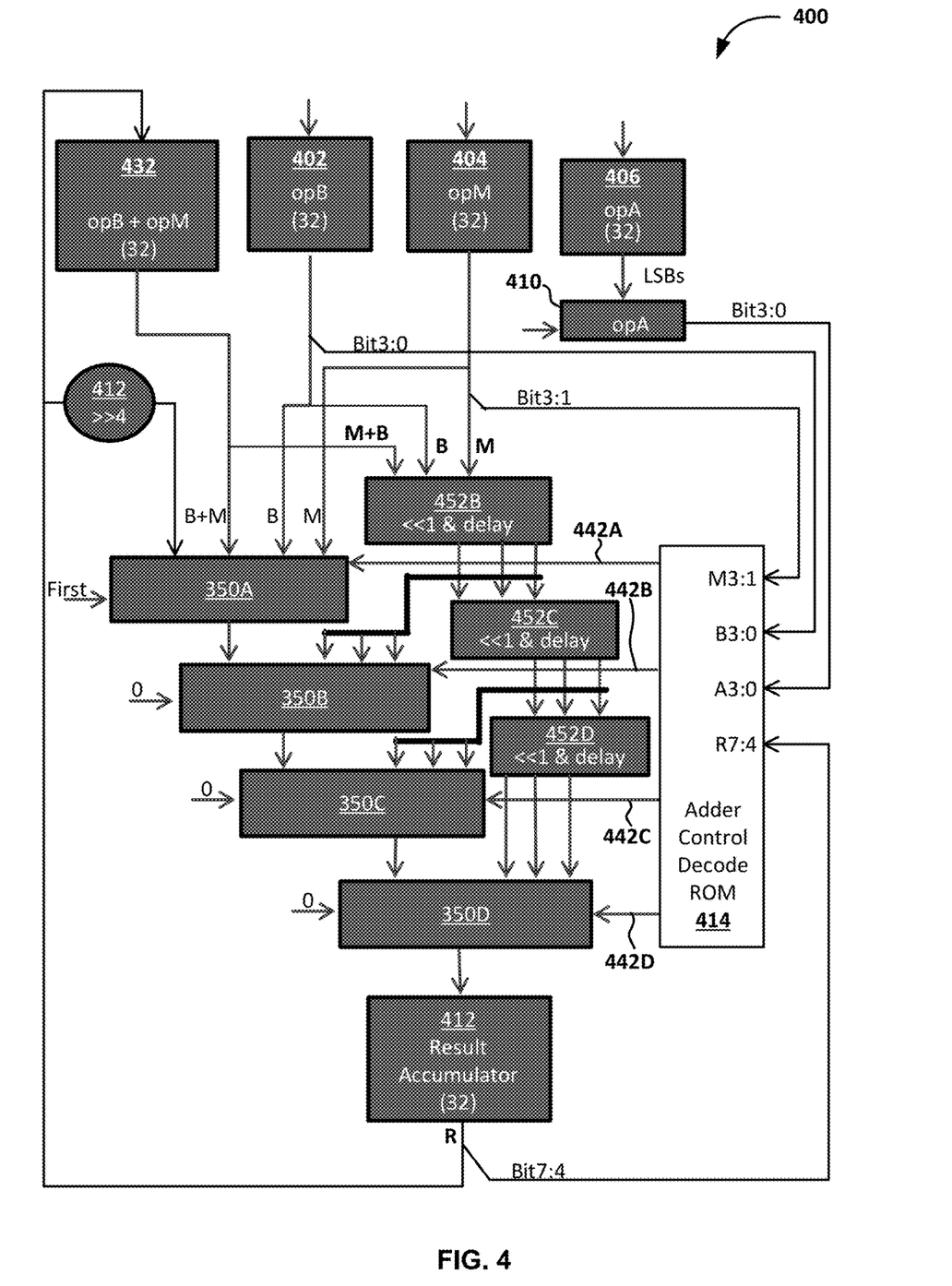
FIG. 4 is a block diagram illustrating a loop unrolling technique using a pipeline architecture 400, in accordance with aspects of the claimed technology.

FIG. 4 is a block diagram illustrating a loop unrolling technique using a pipeline architecture 400, in accordance with aspects of the claimed technology. In various embodiments, the pipeline architecture 400 is implemented in FPGAs, Application Specific Integrated Circuits, Very Large Scale Integrated Circuits, and/or the like. In FIG. 4, there are 32 sets of operands A, B, and M, illustrated as opA 432, opB 402, opM 404, and opA 406, respectively, that may be pipelined, instead of just calculating one set of operands at a time. The four pipeline adders 350A-D of FIG. 4 may be chained as illustrated as pipeline adders 350A-D. Each pipeline adder 350A-D of FIG. 4 is chained using shift/delay registers 452B, 452C, and 452D to shift and delay inputs of the operands M+B, B, and M, into each step. Shift register opA 410 is analogus to shift register 310 in FIG. 3.

Similar to the controller 314 of FIG. 3, an Adder Control Decode ROM 414 may perform logic used to apply select words 442A-D to pipeline adders 350A-D, respectively, to switch between adding 0, B, M, and M+B (shifted as necessary) at each step. Inputs to the ROM 414 that are used for switching the MUX 324 of the pipeline adders 350A-D include bits 7:4 of the intermediate result R and the lowest 4 bits of operands A, B, and M. It is noteworthy that since operand M is always odd, the LSB is always 1. For this reason, FIG. 4 only shows bits 3:1 being applied to the ROM 414. Also, bits 7:4 of the intermediate result R will be the lowest bits after 4 shifts are performed in the next iteration. This process is described by Intermediate Algorithm 2 in Table 4 below.

Table 4 below is an algorithm for describing a process for performing the loop unrolling technique, using a circuit illustrated the block diagram of FIG. 4.

TABLE 4

Intermediate Algorithm 2:

```
int R = 0;
int S = B + M
for i = 0; i < n; i += 4 {
    if a_0 == 0 then
        if r_0 == 0 then
            R' = R
        else
            R' = (R + M)
    else
        if b_0 == r_0 then
            R' = (R + B)
        else
            R' = (R + S)
    if a_1 == 0 then
        if r_1 == r'_1 then
            R' = R' + 2 * R
        else
            R' = R' + 2 * (R + M)
    else
        if r'_1 == 0 and b_0 == r_1 then
            R' = R' + 2 * (R + B)
        else
            R' = R' + 2 * (R + S)
    if a_2 == 0 then
        if r_2 == r'_2 then
            R' = R' + 4 * R
        else
            R' = R' + 4 * (R + M)
    else
        if r'_2 == 0 and b_0 == r_2 then
            R' = R' + 4 * (R + B)
        else
            R' = R' + 4 * (R + S)
    if a_3 == 0 then
        if r_3 == R'_3 then
            R' = R' + 8 * R
        else
            R' = R' + 8 * (R + M)
    else
        if r'_3 == 0 and b_0 == r_3 then
            R' = R' + 8 * (R + B)
        else
            R' = R' + 8 * (R + S)
    A = A div 16
    R = R' div 16
}
if R > M then
    R = R - M
return R
```

It is noteworthy that a batch of 32 results may be generated using about 16448 cycles for the processing of a batch of 32 sets of operands A, B, and M, using the unrolled pipeline architecture 400. This is about four times as fast about 65600 cycles that it might take to generate a batch of results from processing the same batch of 32 sets of operands A, B, and M using the reduced MMM architecture 300.

For simplicity, only four stages (A-D) are illustrated in the pipeline architecture 400 of FIG. 4. However, it may be appreciated that more or fewer stages may be used in hardware such as FPGA's for implementing the unrolled pipeline architecture 400, although a different control calculation may be used. For example, an unrolled pipeline architecture 400 may be implemented using 8, 16, 32, 64, 128, 256, 512, 1024, or more stages. The number of stages is not limited to powers of 2.

The corresponding structures, materials, acts, and equivalents of any means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art with this disclosure before them that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "co-located") may be occasionally interchangeably used with its non-hyphenated version (e.g., "co-located"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/ or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A hardware adder for performing Montgomery modular multiplication, the adder comprising:
    a first operand register for receiving a first operand, second operand register for receiving a second operand, a modulus register for receiving a modulus, and a sum register for receiving a sum of the second operand and the modulus;
    a first shift register configured for receiving the first operand from the first operand register and shifting the first operand;
    a second shift register configured to shift a result of a previous cycle;
    a multiplexer for selecting one of a zero, the modulus, the second operand, and the second operand and modulus sum, responsive to a predetermined bit of the second operand, a bit shifted out of the first shift register, and a predetermined non-least significant bit of the current result;
    an adder configured to receive a selection from the multiplexer and the shifted result of the previous cycle from the second shift register and output the current result; and
    a result accumulator to receive the current result from the adder and output the current result to the second shift register as a previous result and output the predetermined non-least significant bit to a controller;
    the controller including logic configured to:
        receive inputs including the predetermined bit of the second operand, the bit shifted out of the first shift register, and the predetermined non-least significant bit received from the current result output by the result accumulator; and
        provide a MUX select word to the multiplexer based on the received inputs, the select word used for selecting one of zero, the modulus, the second operand, and the second operand and modulus sum,
        wherein the controller includes a lookup table.

2. The hardware adder of claim 1, further comprising a second multiplexer for selecting one of the second shift register output and the second operand for output to the adder, the second multiplexer configured for initializing the sum register with the sum of the second operand and the modulus.

3. The hardware adder of claim 1, wherein inputs of the lookup table include the bits received from the second operand, the shift register, and the result accumulator, and wherein outputs of the lookup table include MUX select words.

4. The hardware adder of claim 3, wherein the lookup table is a matrix, the matrix columns comprising:
- a first column ("B") representing second operand bit inputs, ("B");
- a second column ("A") representing first shift register bit inputs;
- a third column ("R") representing result accumulator bit inputs; and
- a fourth column ("MUX") representing two bit MUX select word outputs; and the matrix rows comprising:

| B | A | R | MUX |
|---|---|---|-----|
| 0 | 0 | 0 | 00 |
| 0 | 0 | 1 | 01 |
| 0 | 1 | 0 | 10 |
| 0 | 1 | 1 | 11 |
| 1 | 0 | 0 | 00 |
| 1 | 0 | 1 | 01 |
| 1 | 1 | 0 | 11 |
| 1 | 1 | 1 | 10. |

5. The hardware adder of claim 3, wherein the lookup table is a matrix, the matrix columns comprising:
- a first column ("B") representing second operand bit inputs;
- a second column ("A") representing first shift register bit inputs;
- a third column ("R") representing result accumulator bit inputs; and
- a fourth column ("MUX select") representing an operand selected using the MUX select word outputs; and the matrix rows comprising:

| B | A | R | MUX select |
|---|---|---|------------|
| 0 | 0 | 0 | zero |
| 0 | 0 | 1 | modulus |
| 0 | 1 | 0 | second operand |
| 0 | 1 | 1 | sum of second operand and modulus |
| 1 | 0 | 0 | zero |
| 1 | 0 | 1 | modulus |
| 1 | 1 | 0 | sum of second operand and modulus |
| 1 | 1 | 1 | second operand. |

6. A system for pipelining Montgomery modular multiplication, the system comprising:
- a first operand register for receiving a first operand, A;
- a second operand register for receiving a second operand, B;
- a modulus register for receiving a modulus, M;
- a sum register for receiving a sum of the second operand and the modulus sum M+B;
- a first shift register configured for receiving the received operand A and shifting out a plurality of bits of A;
- a second shift register configured to receive a result of a plurality of bits and output a shifted result;
- a plurality of pipeline adders chained together such that the first pipeline adder receives the shifted result from the second shift register, and each of a plurality of the subsequent pipeline adders receives a result of a previous pipeline adder, each pipeline adder comprising:
  - a multiplexer for selecting one of a zero, M, B, and sum M+B, responsive to a plurality of bits selected from each of B, the first shift register, and the current result, and
  - an adder configured to add the received result to the selection from the multiplexer and output a result to the next pipeline adder in the chain;
- a plurality of delay modules chained together,
  - the first delay module configured to receive values including sum M+B, B, and M, and delay and shift the received values for output to a subsequent pipeline adder and delay module,
  - each subsequent delay module configured to receive the delayed and shifted values from the previous delay module, and further delay and shift the received delayed and shifted values for output to a subsequent delay module; and
- a result accumulator configured to receive the result from the final pipeline adder in the chain, and output the current result to the second shift register.

7. The system of claim 6, further comprising an adder control module including logic configured to receive a plurality of bits from M, a plurality of bits from B, the plurality of bits shifted out of the first register, and a plurality of bits from the result accumulator.

8. The system of claim 7, wherein the chain of pipeline adders includes 4 pipeline adders and the plurality of bits received from M are bits 3:1, the plurality of bits received from B are bits 3:0, the plurality of bits received from the first shift register are bits 3:0 and the plurality of bits received from the result accumulator are bits 7:4.

9. The system of claim 7, wherein the adder control module includes a plurality of lookup tables.

10. The system of claim 9, wherein the lookup tables are stored in read only memory.

11. A hardware circuit configured for performing a method of calculating a result of Montgomery modular multiplication, the hardware circuit including a multiplexer, a first and second shift register, an adder, and a plurality of registers, the method comprising:
- receiving operand A at a first register of the hardware circuit, operand B at a second register of the hardware circuit, and a modulus M at a third register of the hardware circuit, wherein A, B, and M are n-bit operands, and $a_0$, $b_0$, and $m_0$ are least significant bits respectively;
- setting a result value R in a result register of the hardware circuit to 0;
- initializing a value of a loop counter i in an index register to 0;
- initializing an end of loop value to n;
- performing the following with the multiplexer, the adder, and the first and second shift registers:
  1) if $a_0$ equals 0 and $r_0$ equals 0, then:
     - dividing (R+0) by 2, and
     - placing the result of the division in the result register;
  2) if $a_0$ equals 0 and $r_0$ equals 1, then:
     - dividing (R+M) by 2, and
     - placing the result of the division in the result register;
  3) if $a_0$ equals 1 and $b_0$ equals $r_0$, then:
     - dividing (R+B) by 2, and
     - placing the result of the division in the result register;
  4) if $a_0$ equals 1 and $b_0$ is not equal to $r_0$, then:
     - dividing (R+M+B) by 2, and
     - placing the result in the result register;
  5) dividing A by 2; and
  6) placing the result of the division of A by 2 in the first register;
- adding 1 to i and placing the result of the addition in the index register;

if i is less than n, returning to step 1; and
if R is greater than M then:
subtracting M from R, and
placing the result in the result register.

12. The hardware circuit of claim 11, wherein n is equal to a number of bits in the first register.

13. The hardware circuit of claim 11, further comprising:
using the multiplexer and adder to determine which of the addition steps to perform in steps 1-4; and
using the shift register to perform the division in steps 1-4.

14. The hardware circuit of claim 11, further comprising using the hardware multiplier and a lookup table in steps 1-4 to determine which of the addition steps to perform.

15. The hardware circuit of claim 14, wherein the lookup table is a matrix, the matrix including columns comprising:
a first column representing second operand bit inputs, ("B");
a second column representing first shift register bit inputs, ("A");
a third column representing result accumulator bit inputs, ("R"); and
a forth column representing two bit MUX select word outputs ("MUX"); and the matrix including rows comprising:

| B | A | R | MUX |
|---|---|---|-----|
| 0 | 0 | 0 | 00 |
| 0 | 0 | 1 | 01 |
| 0 | 1 | 0 | 10 |
| 0 | 1 | 1 | 11 |
| 1 | 0 | 0 | 00 |
| 1 | 0 | 1 | 01 |
| 1 | 1 | 0 | 11 |
| 1 | 1 | 1 | 10. |

16. The hardware circuit of claim 11, wherein the hardware circuit is a field programmable gate array.

17. A device for performing Montgomery modular multiplication, the device comprising:
a first register for receiving a operand A, second register for receiving operand B, a third register for receiving a modulus M, wherein $a_0$, $b_0$, and $m_0$ are least significant bits respectively;
a sum register for receiving a sum M+B;
a first shift register configured for receiving A from the first register and repeatedly shifting $a_0$ of A out of the first shift register;
a second shift register configured to shift a result R and output R div 2;
a multiplexer for performing a selection of one of 0, M, B, and M+B based on a received select word;
an adder configured to:
receive the selection of one of 0, M, B, and M+B from the multiplexer,
receive R div 2 from the second shift register, and
add R div 2 to the received selection;
a result accumulator to receive a result of the addition from the adder as the result R and output the result R to the second shift register, wherein $r_1$, $r_0$ are two least significant bits of R; and
a controller including:
logic configured to receive $b_0$, $a_0$, and $r_1$, and output a select word to the multiplexer; and
a lookup table:
inputs of the lookup table being the received $b_0$, $a_0$, and $r_1$, and
output of the lookup table being the select word.

18. The device of claim 17, wherein the lookup table is a matrix, the matrix columns comprising:
a first column ("B") representing second operand bit inputs;
a second column ("A") representing first shift register bit inputs;
a third column ("R") representing result accumulator bit inputs; and
a fourth column ("MUX") representing two bit MUX select word outputs; and
the matrix rows comprising:

| B | A | R | MUX |
|---|---|---|-----|
| 0 | 0 | 0 | 00 |
| 0 | 0 | 1 | 01 |
| 0 | 1 | 0 | 10 |
| 0 | 1 | 1 | 11 |
| 1 | 0 | 0 | 00 |
| 1 | 0 | 1 | 01 |
| 1 | 1 | 0 | 11 |
| 1 | 1 | 1 | 10. |

\* \* \* \* \*

UNITED STATES PATENT AND TRADEMARK OFFICE
CERTIFICATE OF CORRECTION

PATENT NO. : 10,817,262 B2
APPLICATION NO. : 16/184139
DATED : October 27, 2020
INVENTOR(S) : Ryan Carr et al.

Page 1 of 1

It is certified that error appears in the above-identified patent and that said Letters Patent is hereby corrected as shown below:

In the Claims

Column 12 Line 3 In Claim 1, replace "second operand register" with "a second operand register"

Signed and Sealed this
Ninth Day of February, 2021

Drew Hirshfeld
*Performing the Functions and Duties of the
Under Secretary of Commerce for Intellectual Property and
Director of the United States Patent and Trademark Office*